United States Patent
Cavill et al.

(10) Patent No.: US 7,733,521 B1
(45) Date of Patent: Jun. 8, 2010

(54) PRINTER APPARATUS WITH SELECTABLE PHOTO ENHANCEMENT PROJECT AND SETTINGS STORAGE DYNAMICALLY DEFINABLE USER INTERFACE AND FUNCTIONS AND TEMPLATE DEFINITION

(75) Inventors: Barry Richard Cavill, Lexington, KY (US); William Henry Reed, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 0 days.

(21) Appl. No.: 09/610,250

(22) Filed: Jul. 5, 2000

(51) Int. Cl.
*H04N 1/32* (2006.01)

(52) U.S. Cl. .................. 358/1.9; 358/1.16; 358/442; 358/444

(58) Field of Classification Search ............ 358/1.9, 358/1.1, 1.16, 401, 442, 444, 452, 453, 462
See application file for complete search history.

(56) References Cited

U.S. PATENT DOCUMENTS

| | | | |
|---|---|---|---|
| 3,645,619 A | 2/1972 | Burton et al. |
| 3,771,863 A | 11/1973 | Muka |
| 4,293,215 A | 10/1981 | Rosborough, Jr. et al. |
| 4,563,084 A | 1/1986 | Hayat et al. |
| 4,742,375 A | 5/1988 | Kogane et al. |
| 4,751,583 A | 6/1988 | Levine |
| 4,759,053 A | 7/1988 | Satomi et al. |
| 4,827,347 A | 5/1989 | Bell |
| 4,887,161 A | 12/1989 | Watanabe et al. |
| 4,901,075 A | 2/1990 | Vogel |
| 4,965,748 A | 10/1990 | Chang et al. |
| 4,974,151 A | 11/1990 | Advani et al. |
| 5,018,017 A | 5/1991 | Sasaki et al. |
| 5,043,816 A | 8/1991 | Nakano et al. |
| 5,191,440 A | 3/1993 | Levine |
| 5,198,909 A | 3/1993 | Ogiwara et al. |
| 5,220,675 A | 6/1993 | Padawer et al. |
| 5,361,134 A | 11/1994 | Hu et al. |
| 5,392,386 A | 2/1995 | Chalas |
| 5,412,490 A | 5/1995 | Kojima et al. |
| 5,418,565 A | 5/1995 | Smith |
| 5,452,094 A | 9/1995 | Ebner et al. |
| 5,473,370 A | 12/1995 | Moronaga et al. |
| 5,477,264 A | 12/1995 | Sarbadhikari et al. |
| 5,485,590 A | 1/1996 | Hyatt et al. |

(Continued)

FOREIGN PATENT DOCUMENTS

EP 0635965 1/1995

(Continued)

OTHER PUBLICATIONS

LEXMARK, "Lexmark Photo Jetprinter 5770, Jan. 12, 2000."

(Continued)

*Primary Examiner*—Thomas D. Lee
(74) *Attorney, Agent, or Firm*—Dinsmore & Shohl

(57) ABSTRACT

A stand-alone printing apparatus for transferring one or more digital photographs captured by a digital device to a printable medium. The printing apparatus includes an input member for receiving digital photographs from a source and image processing for generating an image corresponding to each of the digital photographs. The photoprinter apparatus includes dynamically definable image processing software and an integrated user interface with template and settings storage capabilities.

13 Claims, 2 Drawing Sheets

U.S. PATENT DOCUMENTS

| | | | |
|---|---|---|---|
| 5,493,335 | A | 2/1996 | Parulski et al. |
| 5,495,561 | A | 2/1996 | Holt |
| 5,499,113 | A | 3/1996 | Tsuboi et al. |
| 5,550,957 | A | 8/1996 | Davidson, Jr. et al. |
| 5,563,722 | A | 10/1996 | Norris |
| 5,566,278 | A | 10/1996 | Patel et al. |
| 5,574,533 | A | 11/1996 | Itoh |
| 5,585,845 | A | 12/1996 | Kawamura et al. |
| 5,587,752 | A | 12/1996 | Petruchik |
| 5,633,678 | A | 5/1997 | Parulski et al. |
| 5,635,982 | A | 6/1997 | Zhang et al. |
| 5,640,495 | A | 6/1997 | Colbert et al. |
| 5,682,441 | A | 10/1997 | Ligtenberg et al. |
| 5,684,601 | A | 11/1997 | Endo |
| 5,696,850 | A | 12/1997 | Parulski et al. |
| 5,699,494 | A | 12/1997 | Colbert et al. |
| 5,699,549 | A | 12/1997 | Cho |
| 5,706,104 | A | 1/1998 | Sugiura et al. |
| 5,739,897 | A | 4/1998 | Ferick et al. |
| 5,742,339 | A | 4/1998 | Wakui |
| 5,745,220 | A | 4/1998 | Okazaki et al. |
| 5,754,748 | A | 5/1998 | Rivers et al. |
| 5,757,394 | A | 5/1998 | Gibson et al. |
| 5,796,428 | A | 8/1998 | Matsumoto et al. |
| 5,797,061 | A | 8/1998 | Overall et al. |
| 5,805,777 | A | 9/1998 | Kuchta |
| 5,821,936 | A | 10/1998 | Shaffer et al. |
| 5,828,461 | A | 10/1998 | Kubo et al. |
| 5,835,136 | A | 11/1998 | Watanabe et al. |
| 5,838,883 | A | 11/1998 | Pekelman |
| 5,861,918 | A | 1/1999 | Anderson et al. |
| 5,862,342 | A | 1/1999 | Winter et al. |
| 5,901,276 | A | 5/1999 | Murahashi et al. |
| 5,903,309 | A | 5/1999 | Anderson |
| 5,917,548 | A | 6/1999 | McIntyre |
| 5,918,192 | A | 6/1999 | Tomaszewski |
| 5,949,469 | A | 9/1999 | Stephenson |
| 5,963,939 | A | 10/1999 | McCann et al. |
| 5,987,614 | A | 11/1999 | Mitchell et al. |
| 5,999,707 | A | 12/1999 | Taniguchi et al. |
| 6,000,864 | A | 12/1999 | Hanada |
| 6,026,215 | A | 2/2000 | Fantone et al. |
| 6,034,785 | A | 3/2000 | Itoh |
| 6,061,665 | A | 5/2000 | Bahreman |
| 6,112,014 | A | 8/2000 | Kane |
| 6,356,357 | B1 | 3/2002 | Anderson et al. |
| 6,417,937 | B1 | 7/2002 | Batten et al. |
| 6,445,461 | B1 | 9/2002 | Ozawa et al. |
| 6,473,498 | B1 | 10/2002 | Foth |
| 6,500,590 | B2 | 12/2002 | Irving et al. |
| 6,504,960 | B2 * | 1/2003 | Takahashi .................. 382/305 |
| 6,552,743 | B1 * | 4/2003 | Rissman .................. 348/207.2 |

FOREIGN PATENT DOCUMENTS

| | | |
|---|---|---|
| EP | 0949804 | 10/1999 |
| JP | 09039337 | 2/1997 |

OTHER PUBLICATIONS

KODAK, "Kodak PM 100 by Lexmark, Jan. 12, 2000."
Hewlett Packard, "HP PhotoSmart P1000 Printer, Product Overview, Data Sheet, Feb. 23, 2000."
Hewlett Packard, "Hewlett Packard, Brochure, PhotoSmart P1000/P1100 Printers, Jul. 1999."
Hewlett Packard, "Hewlett Packard, Brochure, HP PhotoSmart P1000/P1100 Printers, Jul. 1999."
Hewlett Packard, "Hewlett Packard, Brochure, HP PhotoSmart P1000/P1100 Printers, Jul. 1999."
EPSON, "Epson (Color Imaging), Super Colario Photo CP-800, Brochure, Japan, Jun. 29, 1999."
EPSON, "Epson (Color Imaging), printon, Full-Auto AI Photo Processor, Brochure, Japan, May 5, 1999."
FUJI, "Fujifilm (I & I—Imaging & Information), Digital Printer TX-70, Brochure, Japan, Oct. 1998."
FUJI, "Fujifilm (I & I—Imaging & Information), Digital Camera FinePix 1500, Brochure, Japan, Jun. 1999."
FUJI, "Fujifilm (I & I—Imaging & Information), Digital Camera, FinePix 2900z, Brochure, Japan, Jul. 1999."
KODAK, "Kodak, DC240 Zoom, Brochure, Japan, Apr. 1999."
KODAK, "Kodak, DC280J Zoom, Brochure, Japan, Jul. 1999."
KONICA, "Konica, Q-M200, Brochure, Japan."
NIKON, "Nikon, CoolPix950—CoolPix700, Brochure, Japan, May 21, 1999."
OLYMPUS, "Olympus, Camedia P-330, Brochure, Japan."
OLYMPUS, "Olympus, Camedia C-900Zoom, C-830L, P-330, Brochure, Japan."
OLYMPUS, "Olympus, Camedia C-2000ZOOM, Brochure, Japan."
PANASONIC, "Panasonic, COOLSHOTIIMega LK-RQ1302, Brochure, Japan, Jun. 1999."
RICOH, "Ricoh, RDC-5000, Brochure, Japan."
SANYO, "Sanyo, LCD Digital Camera DSC-X110, Brochure, Japan, Feb. 1999."
SONY, "Sony, Digital Photo DPP-MS300, Brochure, Japan, Mar. 1999."
SONY, "Sony, Cyber-shot Digital Still Camera DSC-F55K, Brochure, Japan, Jun. 1999."
TOSHIBA, "Toshiba, Digital Still Camera, Allretto M4, Brochure, Japan."
"FlashPoint Announces Winners of its First Annual Digita Scripting Contest, the Digita Photo Adventure" Steve's Digicams Breaking News, [Online] May 18, 1999, Internet URL http://steves-digicams.co.uk/diginews_may99.html.

* cited by examiner

PRINTER APPARATUS WITH SELECTABLE PHOTO ENHANCEMENT PROJECT AND SETTINGS STORAGE DYNAMICALLY DEFINABLE USER INTERFACE AND FUNCTIONS AND TEMPLATE DEFINITION

TECHNICAL FIELD

This invention relates to the field of printer apparatuses and methods for using the same, and will be specifically disclosed in the context of stand-alone printers adapted to print digital photographs.

BACKGROUND OF THE INVENTION

The advent of computers have fundamentally changed the way images can be stored, manipulated, and printed. Images can now be captured by digital devices, such as digital cameras and scanners, and stored digitally. A digitally stored image can then be transmitted, enhanced, and manipulated through computer programs. Moreover, as digital technology has improved and associated costs fallen, the resolution of the images captured by these devices continues to improve, and in many cases approaches or exceeds the quality of traditional film photography.

Traditionally, to use a digital image one needed a computer. The computer would be loaded with a variety of different programs to transmit, enhance and manipulate the digital images. To obtain a hard copy of the digital image, the user would direct the computer with an appropriate series of commands to send a "print job" from the computer to a traditional printer. While the traditional model works, it does have attendant shortcomings, such as being expensive, complicated, non-portable, etc. To combat such shortcomings, various manufacturers began offering stand-alone printers designed to print digital images. One example of a stand-alone printer is disclosed in U.S. patent application Ser. No. 09/164,500, filed on Oct. 1, 1998 and assigned to same assignee herein, Lexmark International, Inc. While stand-alone printers have proven to have remarkable benefits over the traditional model, the present invention offers even more benefits and improvements for stand-alone printers.

SUMMARY OF THE INVENTION

Accordingly, an object of the invention is to provide an improved stand-alone printer. Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims.

One embodiment of the present invention is to provide a stand-alone printer which enables selectable photo enhancement of images to be printed on the same page.

Another embodiment of the present invention is to provide a stand-alone printer with a dynamically definable user interface and functionality.

Yet another embodiment of the present invention is to provide a stand-alone printer which enables template definition and printing of templates, wherein the templates comprise one or more images, text selections, graphical line art, and the like.

Another embodiment of the present invention is to provide a stand-alone printer which enables project and setting storage.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

DETAILED DESCRIPTION

Figure 1:
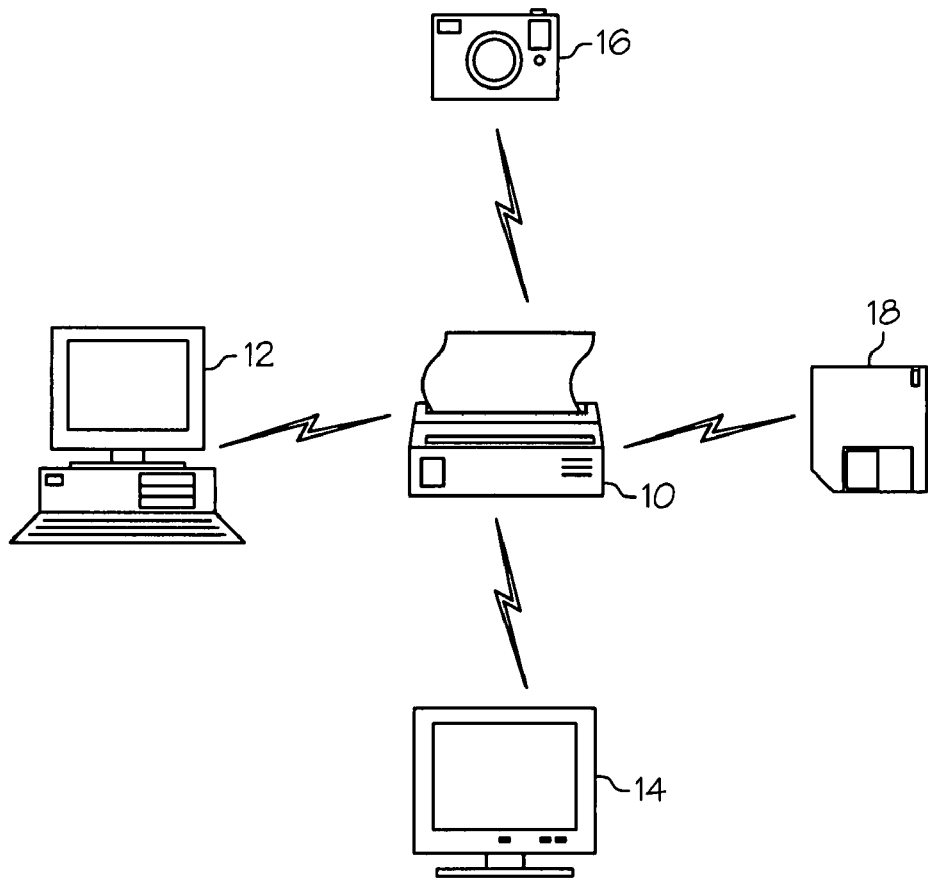
FIG. 1 depicts a photoprinter communicating with a variety of external components.

Reference will now be made to the present preferred embodiment of the invention, an example of which is illustrated in the accompanying drawings, wherein like numerals indicate the same element throughout the views. FIG. 1 illustrates one embodiment of a photoprinter 10. As used herein, a "photoprinter" refers to a stand-alone appliance for printing digital photographs onto a printable medium. A "digital photograph" is a photographic image captured by a light sensing electronic device (e.g., CCD, CMOS, CID, or the like) and converted into a digital file capable of being stored on a computer readable medium. The term "stand-alone" means that the printer is capable of processing and printing digital files independent of an external host device, such as a computer, wherein "processing" means calculating a pixel pattern to be printed on the printable medium that represents the corresponding digital file (sometimes referred to as "ripping" or generating printing code). For instance, a printer is considered stand-alone if an external device merely passes a digital photograph to the printer and the printer contains the logic for processing and printing the digital photograph. The foregoing definitions are inclusive and open-ended. For example, a stand-alone printer may additionally be capable of receiving printing code from an external device. As a further example, a photoprinter may additionally be capable of processing and printing digital files other than digital photographs, such as text files, word processing files, HTML files, and the like.

The photoprinter 10 is operative to print digital photographs on printable media (e.g., paper, glossy film or photo paper, index cards, labels, envelopes, transparencies, coated paper, cloth, etc.). In one preferred embodiment, the photoprinter 10 works by transferring an ink (e.g., toner, dye, pigment, wax, carbon, etc.) onto a printable medium. For instance, the photoprinter 10 can employ conventional thermal ink jet technology, however, it is contemplated that the present invention can be adapted for use with other types of ink jet technologies, such as piezo ink jet. In addition, the present invention can be adapted for use with other printer technologies, such as electrophotography, dye diffusion, thermal transfer, and the like.

While the photoprinter 10 operates as a stand-alone printer, it can nevertheless communicate with a variety of external components, only a portion of which are illustrated in FIG. 1. In the present example, the photoprinter 10 can communicate to a computer 12 using any one of a variety of different communication links, such as parallel cables, serial cables, telephone lines, universal serial bus port "USB", firewire, bluetooth, fiber optics, infrared "IR", radio frequency "RF", network interface cards (e.g., Ethernet, token ring, etc.), and the like. The computer 12 can be any conventional or special purpose computer, such as a desktop computer, a tower computer, a micro-computer, a mini-computer, server, workstation, palmtop computer, notebook computer, or the like. Through the communication link, the photoprinter 10 can receive digital photographs from the computer 12 for processing and printing. In one embodiment, the computer 12 is programmed to generate printing code (e.g., via locally loaded print drivers) and the photoprinter 10 is capable of receiving the externally processed printing code for direct printing. As such, the photoprinter 10 would have dual functionality: a stand-alone printer as well as a more conventional printer for receiving commands from an external device.

In the present example, the photoprinter 10 can also communicate with an external display 14 (e.g., a television, monitor, LCD, or the like) using an appropriate communication link. In such a configuration, the photoprinter 10 can generate and send appropriate signals to present a user interface to operate the photoprinter 10 or preview digital photographs on the display 14. The photoprinter 10 also can communicate with a digital camera 16 using an appropriate communication link. Typically, a digital camera 16 includes one or more lenses that focus light into an image on a light sensing electronic device, and stores the image as a digital photograph. In one embodiment, the photoprinter 10 can retrieve, process and print digital photographs stored in the camera 16.

The photoprinter 10 can also communicate with a computer readable medium 18, shown here as a floppy diskette. A computer readable medium stores information readable by a computer, such as programs, data files, etc. As one with ordinary skill in the art will readily appreciate, a computer readable medium can take a variety of forms, including magnetic storage (such as hard drives, floppy diskettes, tape, etc.), optical storage (such as laser disks, compact disks, digital video disks "DVD", etc.), electronic storage (such as random access memory "RAM", read only memory "ROM", programmable read only memory "PROM", flash memory, memory sticks, etc.), and the like. Some types of computer readable media, which are sometimes described as being non-volatile, can retain data in the absence of power so that the information is available when power is restored.

The photoprinter 10 preferably interfaces with the computer readable medium 18 using an internal or external drive. As used herein, the term "drive" is intended to mean a structure which is capable of interfacing with (e.g., reading from and/or writing to) a computer readable medium. Naturally, suitable drives will vary depending upon the specific computer readable medium 18 being employed. In a preferred embodiment, the photoprinter includes first and second drives each adapted to receive a solid state flash memory card. The first and second drives are preferably both internal drives. Flash memory cards, due to their very small size and lightweight, are a highly portable computer readable medium which are electrically re-writable and are non-volatile. More preferably, the first and second drives are adapted to receive different types of flash memory cards, such as a NAND type of flash memory card (e.g., a SMART MEDIA card developed by Toshiba, Inc.) or a PCMCIA type of flash memory card (e.g., the COMPACTFLASH developed by SanDisk, Inc.).

Figure 2:
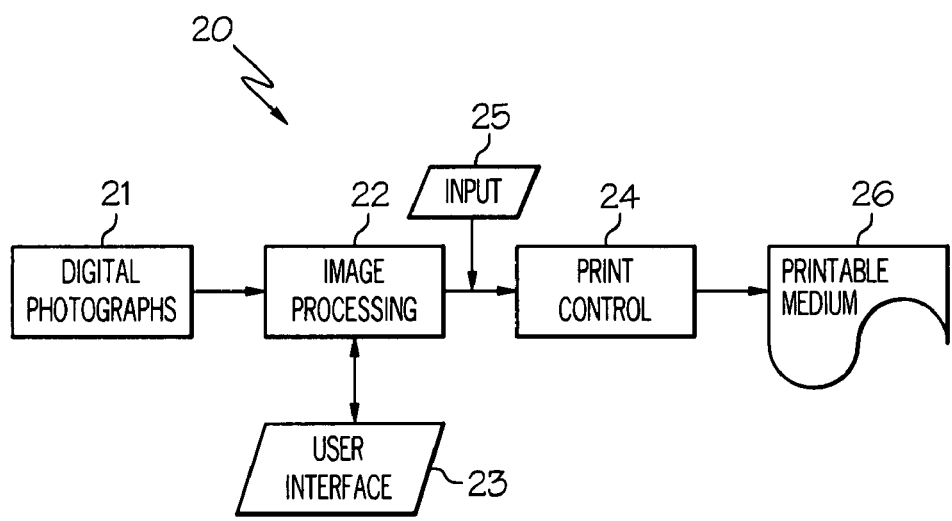
FIG. 2 depicts a operational block diagram for the photoprinter of FIG. 1.

FIG. 2 depicts a preferred operational block diagram 20 for the photoprinter 10. One or more digital photographs 21 are input to the image processing block 22, located internal to the photoprinter 10. The digital photographs 21 can be received from a variety of different sources, whether internal to the photoprinter 10 or from an external source via a drive, communications link, or the like. Furthermore, the digital photographs 21 can take any one of a variety of different file formats, whether raster, vector, or other format (e.g., GIF, TIFF, PCX, JPEG, EXIF, CIFF, JFIF, etc.).

The image processing block 22 is responsible for calculating a pixel pattern to be printed on the printable medium 26 that represents the corresponding digital photographs 21, sometimes referred to in the art as generating printing code. The image processing block 22 may optionally enhance the digital photographs 21. For instance, photo enhancement software, such as the PICTURE IQ software by Digital Intelligence, may be incorporated into the image processing 22. Further, image processing 22 may optionally include a variety of different resources to modify the printed rendition of the digital photographs 21, such as the addition of text, frames, templates, scaling, etc. Enhancements or resources may be implemented before and/or after the digital photographs 21 are converted to printing code. A user interface 23 is provided to allow a user to interact with and/or direct the image processing block 22 (e.g., controlling the enhancements and/or resources). The user interface 23 may be with integral to the photoprinter 10 or located on an external component. Preferably, however, the photoprinter 10 includes an LCD display with one or more buttons or other input devices. Optionally, the user interface 23 may take the form of a series of instructions accompanying the digital photographs 21, such as a digital print order format.

In one embodiment of the present invention, the user interface 23 and the functionality of the image processing software 22 are dynamically definable. The functions within the photoprinter can be expanded by using any removable memory that is available or accessible by the photoprinter to permit the addition of a sequence of instructions or directions to the internal printer instructions to permit guiding a user in a new process. Some examples of possible expansions in functionality include: the instructions for including a series of photographs of a house into a real estate template, instructions for including photographs in a specific sequence into a presentation, instructions for obtaining help with a task, instructions for printing out a sequence of quick reference guides, Internet or network connection, remote computer connection, and updated image processing software.

Preferably, the image processing software 22 of the photoprinter continuously monitors the addition of removable storage memory media. Upon the insertion of the removable storage memory media, the image processing software 22 scans the removable storage memory media to determine the contents of the removable storage memory media. In a preferred embodiment, the image processing software 22 compares the file type extensions of files located on the removable storage memory media with known file type extensions. For example, a file extension of "tif" or "jpg" would be interpreted by the image processing software 22 to contain a digital image file. On the other hand, a file extension such as "pgn" may be interpreted as containing a plug-in module to add additional functionality to the image processing software 22 and photoprinter apparatus 10. Preferably, the analysis by the image processing software 22 is performed anytime removable storage memory media is inserted or removed from the photoprinter system. If the image processing software 22 detects an additional resource, the image processing software 22 will preferably modify the user interface 23 at the appropriate location to correspond to the additional functionality of the photoprinter 10 that is now available. As a result of the addition of the information on the storage media, the new processes are added without user intervention to the functions that are typically supplied with the photoprinter and the user interface creates additional menu links to correspond to the new instruction processes. This dynamic addition of functionality can comprise image enhancement plug-ins, project storage settings, template definition files, text phrases, graphical art, and utilities such as network or Internet connection capabilities. The utilization of a dynamically definable user interface 23 and functionality of the photoprinter apparatus 10 permits the expansion of the shipped capabilities of the photoprinter 10.

Preferably, the menu system within the photoprinter is defined such that an identifier is associated with each menu segment where the addition of processes or macros may be included. These identifiers are used by the photoprinter software to define locations where the processes in the storage media may be attached to particular menu structures that exist in the user interface. In essence, the identifier defines a potential location where the new processes are to be included within the appropriate menu structures.

Figure 3:
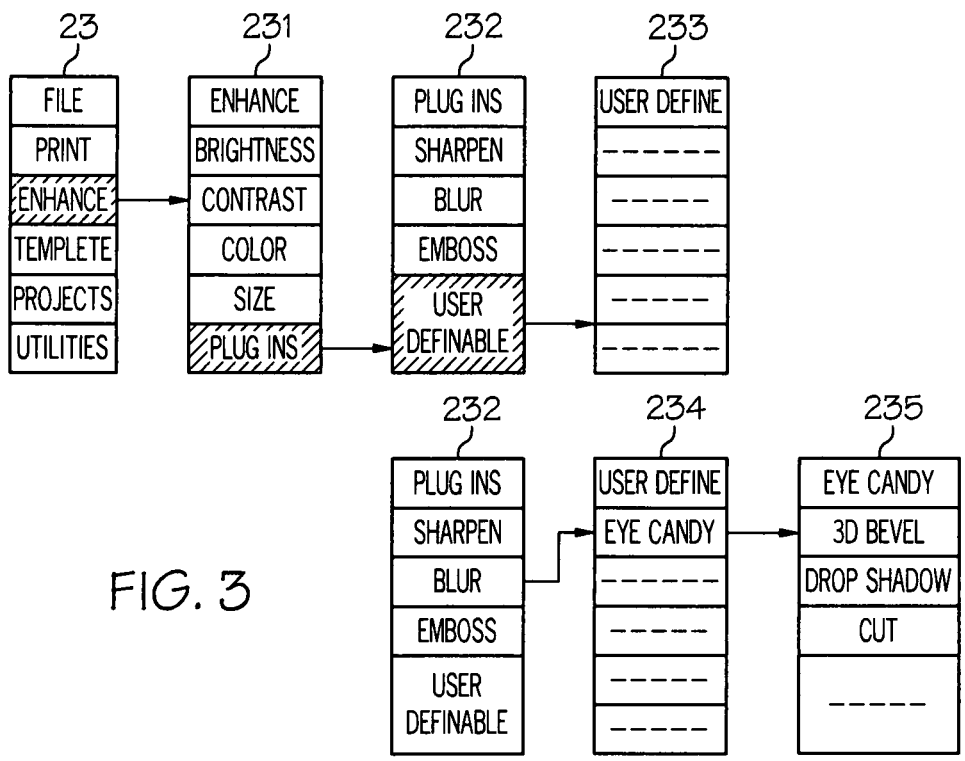
FIG. 3 depicts exemplary user interface display screens for the photoprinter of FIG. 1.

FIG. 3 depicts an exemplary user interface 23 according to a preferred embodiment of the present invention. The user of a photoprinter 10 through the user interface 23 can select to apply one or more photo enhancements to the digital image. Exemplary screen 231 allows the user to select which type of enhancement to apply to the digital image. Typical enhancements include brightness, contrast, color control, size alteration and plug-ins. Plug-ins refer generically to photo enhancement modules or files that can be dynamically added to the image processing software 22. These plug-ins function in a similar manner as plug-in modules for Adobe Photoshop from Adobe, Inc. Typically, the host application communicates with a plug-in module via an application programmer interface (API) which includes a set of standardized calls. The API sets up a standard way for any host application to communicate with a plug-in module without having to know what goes on inside the plug-in module. The Photoshop API by Adobe Systems Inc. is becoming a widely used standard interface between applications and plug-in modules. Upon selection of "plug-ins" on user interface screen 231, the user is provided with a plug-in module selection screen 232. This screen typically will contain plug-ins modules that are part of the image processing software 22 and user definable plug-in modules that were added after the software of the photoprinter was created. If the removable storage memory media contains no plug-in modules, the user interface 23 will resemble screen 233. Upon insertion of a removable storage memory media containing one or more plug-in modules, the user interface 23 will resemble screen 234. Screen 234 depicts that a user-definable plug-in module titled "Eye Candy" has been installed and is available for selection. Upon selecting "Eye Candy", the user interface 23 displays an additional screen 235 corresponding to the selected plug-in module. In the exemplary screen 235, three image enhancements can be selected from the "Eye Candy" plug-in module: 3D Bevel, Drop Shadow or Cut. Upon selection of one of the enhancements, the image processing software 22 will read the plug-in module and apply the API calls to enhance the digital image.

Preferably, when the removable storage memory media containing the plug-in module is removed from the photoprinter system, the user interface 23 will remove the plug-in as an available option as depicted in exemplary screen 233.

In a preferred embodiment, the removable storage memory media comprises a CompactFlash memory media containing a plug-in module comprising a complex set of instructions for a new process available to the user of the photoprinter. In another preferred embodiment, plug-in modules may be downloaded from a network or the Internet and stored on a removable storage memory media.

Another embodiment of the present invention is the ability to store user settings and user selections of the user interface 23. Typically, the process of selecting an image, applying one or more image enhancements, and selecting the desired print output involves multiple selections through the user interface 23. If a user desires to repeat the exact same steps, the user must re-enter every selection. The present invention includes the ability to store the sequence of selections to allow the user to more easily repeat the same process. This capability is similar to saving a macro on a computer program. In a preferred embodiment, the user can store settings for image selection, image enhancements, print settings and page layout selections.

Preferably, the user settings and selections are first input by the user through the user interface 23. After the user has completed making the desired selections, the user through the user interface 23 is given the opportunity to store the settings and selections of the user interface for this image on a removable storage memory media or a network or Internet location. After storage of the settings has been requested, the user may then be asked to create an identifier that can be used for future retrieval of the "project" settings. The user can choose a printer selected name such as "project 01" or can enter the characters for a name of their choice. The project is then stored on the removable storage memory media or network or Internet location if available. When desired by the user, the project settings can be retrieved from the removable storage memory media or network or Internet location by selecting the named project through the user interface 23. In one embodiment, the original photo digital image files are stored with the project settings. This enables the user to retrieve the complete project file without having to utilize the original camera memory card or another storage location containing only the digital image files. In another embodiment, only the user selections are stored as a project to minimize use of memory storage space. This embodiment minimizes the amount of memory storage space required on the storage device.

Preferably, the stored settings can be used with various original photo image files. For example, the same project settings can be used with another camera memory card providing the number of required images by the project are present on the new memory card.

In another embodiment, projects can be combined together to create an "album." Preferably, the album is created through the user interface 23. The album preferably consists of a list of projects to be printed in a specific order. The album will permit the selection of a number of saved projects in the specified sequence that will be saved under a named album identifier. Typically, the album creation will be supported for projects that are stored on removable storage memory media. In another embodiment, the album files can be stored at a network or Internet location. The user will then, at the desired time, retrieve the named album through the user interface and print the pages in the order specified in the album.

In a preferred embodiment, the project and settings storage capability of the photoprinter comprise image enhancement and photographic resources including templates, fonts, and frames. The image enhancement software includes object and file definitions for frame, text, page size, graphic image, template and albums.

In yet another embodiment of the present invention, the photoprinter image enhancement software comprises template definition and template printing. A template is a printable page format in which one or more photographic images are combined together on a page, optionally with added artistic images and/or text selections. Preferably, the template contains graphical line art, text and locations for digital images to be inserted. The templates can be related to special occasions, seasons, business, etc. In another embodiment, customized and professional templates may be utilized through the use of removable storage memory media and/or network/Internet storage locations. Preferably, the template can be created and printed all within the user interface 23 and photoprinter 10, without the requirement of PC knowledge. The desired page layout can be selected from the user interface 23 under a list of templates. In another embodiment, the template file can be created on a PC using an appropriate file editor known to one skilled in the art. The template file can then be transferred to the photoprinter system and utilized when desired. Preferably, each digital image utilized in a template printing can have independent and separate image enhancement settings for the digital image. The template may consist of one or more single page templates or a complete multi-page template. Preferably, the template is selected via the user interface 23 with an identifier that is associated with a printed description of the template or print sample.

Preferably, each template or page layout description permits selection of one or more digital photographic images, comprising both unmodified images from the digital camera and images that have been enhanced via the image processing software 22, to be positioned at defined locations on the page. For each photo position that is pre-defined on the page for a template, a photo image is selected for printing at that position. The template definition associates the page position information with the photo image file. In a similar manner, a background or other graphical image may be selected for usage with the template. The graphical image may be included as part of the template selection or may be selected for usage within the template. The graphical image may be included as part of the template selection or may be selected separately if the template layout includes the opportunity to include a graphical image. Likewise, text messages can be selected as desired and associated with text positions with page templates. Text messages can be selected in a variety of means and may include text messages that can be personalized by the user. Once a text message is selected and associated with a template position, the physical position, color, font and size of the text message can be established.

In a preferred embodiment, each template is defined as a collection of photo image positions, background art or images or positions, and text selection positions along with information that describes the position, size, and other physical characteristics of these positions as well as the definitions of the page characteristics. For example, each of n photo image locations on a page might be defined as the photo image position referenced from a page origin value and the horizontal and vertical size of the image to be printed. Each of 0 to n graphical images might be similarly described as a source image location or index and the position of the image on the page referenced from a page origin value and a horizontal and vertical size of the image. Likewise, each 0 to n text messages might be described as a text message string and the position on the page relative to the page origin value where the text is positioned.

Another embodiment of the present invention comprises a photoprinter with the capability of selective image enhancement. Selective image enhancement means the ability to individually enhance separate images that are to be printed on the same page. Both algorithmic as well as image manipulation functions can be applied individually to the photographs selected for printing. Different selections of algorithms and other enhancements may be applied individually to photographs that are to be printed on the same or multiple pages. Typically, printers require the same enhancements be applied uniformly to all images being printed on the same page. For example, if a text message is applied to one of the four images on a page, all four images would have the same text message. The present embodiment allows a user to enhance two or more images to be printed on the same page with different image enhancements. A photograph is first selected for printing and then any desired enhancements may be associated with the photograph. Preferably, photographs to be printed are selected from the total quantity of available photographs on a selected memory device, such as CompactFlash or SmartMedia.

Figure 4:
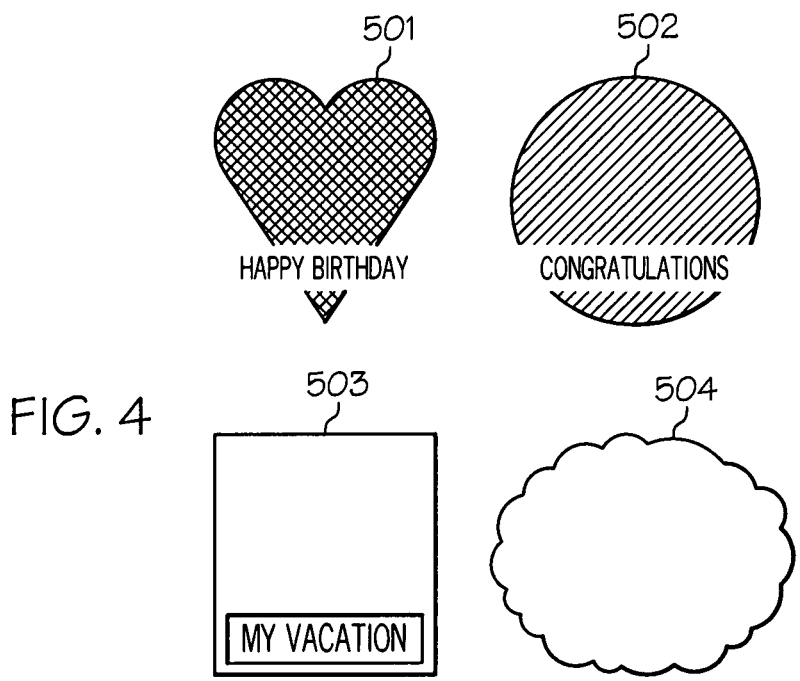
FIG. 4 depicts an exemplary output for the photoprinter of FIG. 1 of the present invention.

FIG. 4 depicts a sample printed output from a photoprinter of the present invention. FIG. 4 comprises three image files that have been enhanced (501-503) and one control image file containing no enhancements (504). Image 501 is a digital image of a heart with the enhancement of selectable text positioned on the image of "Happy Birthday". Image 502 printed on the same page is a circle with a diagonal line pattern and the enhancement of selectable text positioned on the image of "Congratulations". Image 503 printed on the same page is a digital photograph with the enhancement of selectable text positioned on the image of "My Vacation". Image 504 printed on the same page is a digital image containing no enhancements. Preferably, the photoprinter utilizes a memory buffer where the individually enhanced image can be stored until the entire page of images has been created.

The print code generated during image processing 22 is passed to the print control 24. In the cases where printing code is generated from an external source (e.g., computer 12), such printing code can be input 25 directly to the print control 24, thus bypassing the image processing block 22. The print control 24 is responsible for directing the physical transference of the pixel pattern represented by the printing code to the printable medium 26. The photoprinter 10 is preferably in the form of a thermal ink jet printer having one or more conventional thermal ink jet print heads. During printing, the print control 24 directs one or more motors to move the printable medium 26 longitudinally relative to the photoprinter 10 so that it is properly positioned for deposition of an ink pattern or swath. Once the printable medium 26 is in position, the print control 24 directs the print head to move along a conventional print head carriage in a direction transverse to the longitudinal direction while firing droplets of ink onto the surface of the printable medium 26. The print head may make one or more of these transverse passes to complete printing for the swath. After the swath is complete, the printable medium=s 26 position is adjusted longitudinally for the printing of the next swath.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the amended claims.

We claim:

1. A stand-alone printing apparatus for transferring one or more digital photographs captured by an external digital camera to a printable medium, the printing apparatus comprising:
   an input member for receiving one or more digital photographs recorded on computer readable memory associated with the external digital camera;
   an image processing system for generating an image corresponding to each digital photograph;
   a user interface affixed to the printing apparatus for selecting the one or more digital photographs to be transferred to the printable medium; and
   a print control for producing on the printable medium a pixel pattern associated with the selected digital photographs,
   wherein the user interface is capable of being expanded from a first level of functionality to a second level of functionality in relation to initiating interaction with a computer readable medium comprising executable instructions, and is capable of being reduced from the second level to the first level in relation to ceasing interaction with the computer readable medium; and further wherein the printing apparatus is capable of calculating the pixel pattern to be printed on the printable medium and printing digital files, the calculating and printing being independent of an external host device.

2. The stand-alone printing apparatus of claim 1, wherein the image processing system is dynamically expandable in functionality through the utilization of one or more plug-in modules.

3. The stand-alone printing apparatus of claim 2, wherein the input member comprises at least one drive for receiving a computer readable medium, wherein the computer readable medium comprises one or more plug-in modules.

4. The stand-alone printing apparatus of claim 1, wherein the input member comprises at least one drive for receiving a computer readable medium, wherein the computer readable medium comprises instructions for dynamically expanding the user interface.

5. The stand-alone printing apparatus of claim 1, wherein the image processing system comprises the capability of being expanded through plug-in modules.

6. The stand-alone printing apparatus of claim 5, wherein the plug-in modules comprise a sequence of instructions.

7. A photoprinter comprising:
   an input member for receiving one or more digital photographs recorded on computer readable memory associated with an external digital camera;
   an image processing system for generating an image corresponding to each digital photograph;
   a user interface affixed to the printing apparatus; and
   a print control system capable of calculating a pixel pattern to be printed on a printable medium corresponding to at least one of the digital photographs and printing digital files, the calculating and printing being independent of an external host device;
   wherein the user interface is capable of being expanded from a first level of functionality to a second level of functionality in relation to initiating interaction with a computer readable medium comprising executable instructions, and is capable of being reduced from the second level to the first level in relation to ceasing interaction with the computer readable medium.

8. The photoprinter of claim 7, wherein the user interface comprises a video display screen.

9. The photoprinter of claim 7, wherein the image processing system comprises a dynamically expandable image processing system with additional functionality capable of being added through utilization of one or more plug-in modules.

10. The photoprinter of claim 9, wherein the image processing system further comprises the ability to store settings and user selections on a removable storage memory media.

11. The photoprinter of claim 7, wherein the image processing system further comprises template definition and printing.

12. The photoprinter of claim 11, wherein the template definition comprises one or more items selected from the group consisting of photo images, background art, images and text selections.

13. The photoprinter of claim 12, wherein the template definition further comprises the position, size and physical characteristics corresponding to the items.

* * * * *